(12) United States Patent
Ha et al.

(10) Patent No.: US 10,721,417 B2
(45) Date of Patent: Jul. 21, 2020

(54) CAMERA MODULE

(71) Applicant: Samsung Electro-Mechanics Co., Ltd., Suwon-si (KR)

(72) Inventors: Joo Young Ha, Suwon-si (KR); Jae Kyung Kim, Suwon-si (KR); Cheong Hee Lee, Suwon-si (KR); Sang Hyo Seo, Suwon-si (KR); Hee Sung Jun, Suwon-si (KR); Hwan Soo Park, Suwon-si (KR); Hyuk Joo Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/196,029

(22) Filed: Nov. 20, 2018

(65) Prior Publication Data

US 2020/0007729 A1    Jan. 2, 2020

(30) Foreign Application Priority Data

Jun. 28, 2018   (KR) ......................... 10-2018-0074711

(51) Int. Cl.
| | |
|---|---|
| G03B 9/06 | (2006.01) |
| H04N 5/238 | (2006.01) |
| H04N 5/225 | (2006.01) |
| G03B 7/08 | (2014.01) |
| G02B 7/02 | (2006.01) |

(52) U.S. Cl.
CPC ............. *H04N 5/238* (2013.01); *G02B 7/021* (2013.01); *G03B 7/08* (2013.01); *G03B 9/06* (2013.01); *H04N 5/2254* (2013.01)

(58) Field of Classification Search
CPC ....................................................... G03B 9/06
USPC ........................................................ 396/451
See application file for complete search history.

(56) References Cited

U.S. PATENT DOCUMENTS

| | | | | |
|---|---|---|---|---|
| 2011/0122311 A1* | 5/2011 | Han | .......................... | G03B 9/14 348/362 |
| 2017/0357144 A1* | 12/2017 | Kim | .......................... | G03B 9/06 |
| 2018/0213137 A1* | 7/2018 | Park | ........................ | H04N 5/238 |

FOREIGN PATENT DOCUMENTS

| | | |
|---|---|---|
| KR | 10-2012-0124876 A | 11/2012 |
| KR | 20-0468693 Y1 | 8/2013 |
| KR | 10-2017-0139982 A | 12/2017 |

* cited by examiner

*Primary Examiner* — Clayton E. LaBalle
*Assistant Examiner* — Fang-Chi Chang
(74) *Attorney, Agent, or Firm* — NSIP Law (57) ABSTRACT

A camera module includes a first lens barrel including a first lens, a second lens barrel including a second lens that is aligned with the first lens in an optical axis direction, and a stop module disposed between the first lens barrel and the second lens barrel. The stop module includes blades configured to form one or more incidence holes having various sizes. The stop module includes a magnet portion including a driving magnet opposing a driving coil, and the magnet portion moves back and forth rectilinearly.

19 Claims, 8 Drawing Sheets

CAMERA MODULE

CROSS-REFERENCE TO RELATED APPLICATION

This application claims the benefit under 35 USC 119(a) to Korean Patent Application No. 10-2018-0074711 filed on Jun. 28, 2018 in the Korean Intellectual Property Office, the entire disclosure of which is incorporated herein by reference for all purposes.

BACKGROUND

1. Field

The following description relates to a camera module.

2. Description of Related Art

Generally, degradation of camera images due to a temperature change or a surrounding environment mostly occurs in surveillance cameras such as CCTV cameras, and the like. However, as utilization of vehicle cameras has increased and a field of application for vehicle cameras has been expanded, it has become necessary to resolve the problem of image degradation caused by a surrounding environment. In other words, in most vehicles, a large number of cameras, such as surround view monitoring (SVM) cameras, and the like, have been provided in an advanced driver assistance system (ASAS) along with a rear-facing camera, and it has been expected that various cameras having a variety of functions will continue to be provided in vehicles.

Also, as the consumption and necessity of autonomous driving systems have increased, it has been important to stably obtain images by an advanced driver assistance system (ADAS) in vehicles.

However, traffic signs, traffic lights, and a variety of lighting devices use light-emitting diodes (LEDs), and most LEDs for lighting and signaling use a pulse-width modulation (PWM) control. LED devices have different blinking periods, depending on types of LED devices, and LEDs appear to flicker in images input to a camera. The method for resolving the flickering issue is called LED flicker mitigation (LFM).

Depending on different types of light sources, flickering periods of LED devices are different, and to implement LFM, an exposure time of a camera needs to be longer than the flickering period of an LED. However, this may lead to saturation of a portion or of an overall image in a daytime in fine weather, and a dynamic range of the saturated image may decrease.

Meanwhile, to perform LFM in a camera having a relatively small diameter stop, the camera may need to be exposed for a longer period of time than an LED flickering period to have at least one or more of a period in which an LED is on. However, in the case in which a diameter of a stop is relatively large, if the exposure time is reduced to prevent image saturation in order to compensate for dynamic range, it may be difficult to implement LFM.

Accordingly, it has been necessary to provide a device capable of appropriately adjusting an exposure time and an exposure amount in a camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a first lens barrel including a first lens, a second lens barrel including a second lens that is aligned with the first lens in an optical axis direction, and a stop module disposed between the first lens barrel and the second lens barrel. The stop module includes blades configured to form one or more incidence holes having various sizes. The stop module includes a magnet portion including a driving magnet that opposes a driving coil, and the magnet portion moves back and forth rectilinearly.

The first lens barrel may be disposed on an object side of the stop module, and the second lens barrel may be disposed on an image side of the stop module.

The driving coil may be fixed in the second lens barrel.

The blades may be disposed in an object side portion of the stop module, and the stop module may include a base that includes a driving guide portion extended in the optical axis direction.

The magnet portion may be mounted on the driving guide portion.

The base may include a yoke opposing the driving magnet.

The second lens barrel may include a seating portion and the driving coil may be fixed in the seating portion.

The driving guide portion may extend internally of the seating portion.

The second lens barrel may include an interpolated portion to accommodate the first lens barrel.

The camera module may include a cover member to cover upper portions of the first lens barrel and the second lens barrel in a state in which the first lens barrel is inserted into the cover member.

The camera module may include a coil mounting member coupled to the seating portion in a state in which the driving coil is coupled to the coil mounting member.

The driving coil may be mounted on a substrate, and the substrate may extend externally of the second lens barrel.

The driving guide portion may include a yoke that opposes the driving magnet.

The magnet portion may include a support portion extended to an object side portion of the base, and the support portion may include a through-hole through which light penetrates.

The base may include a bearing configured to facilitate a movement of the support portion.

In another general aspect, camera module includes a first lens barrel having a first lens, a second lens barrel coupled to a driving coil, and having a second lens that is aligned with the first lens in an optical axis direction, blades disposed between the first lens barrel and the second lens barrel to adjust a size of one or more incidence holes formed by through-holes in the blades, and a magnet portion including a driving magnet that opposes the driving coil to move back and forth rectilinearly in a direction perpendicular to the optical axis direction.

At least two of the blades may overlap each other in the optical axis direction.

The blades may to rotate in order to adjust the size of the one or more incidence holes.

The blades may include a first blade to rotate in a first direction and a second blade to rotate in a second direction that is opposite to the first direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
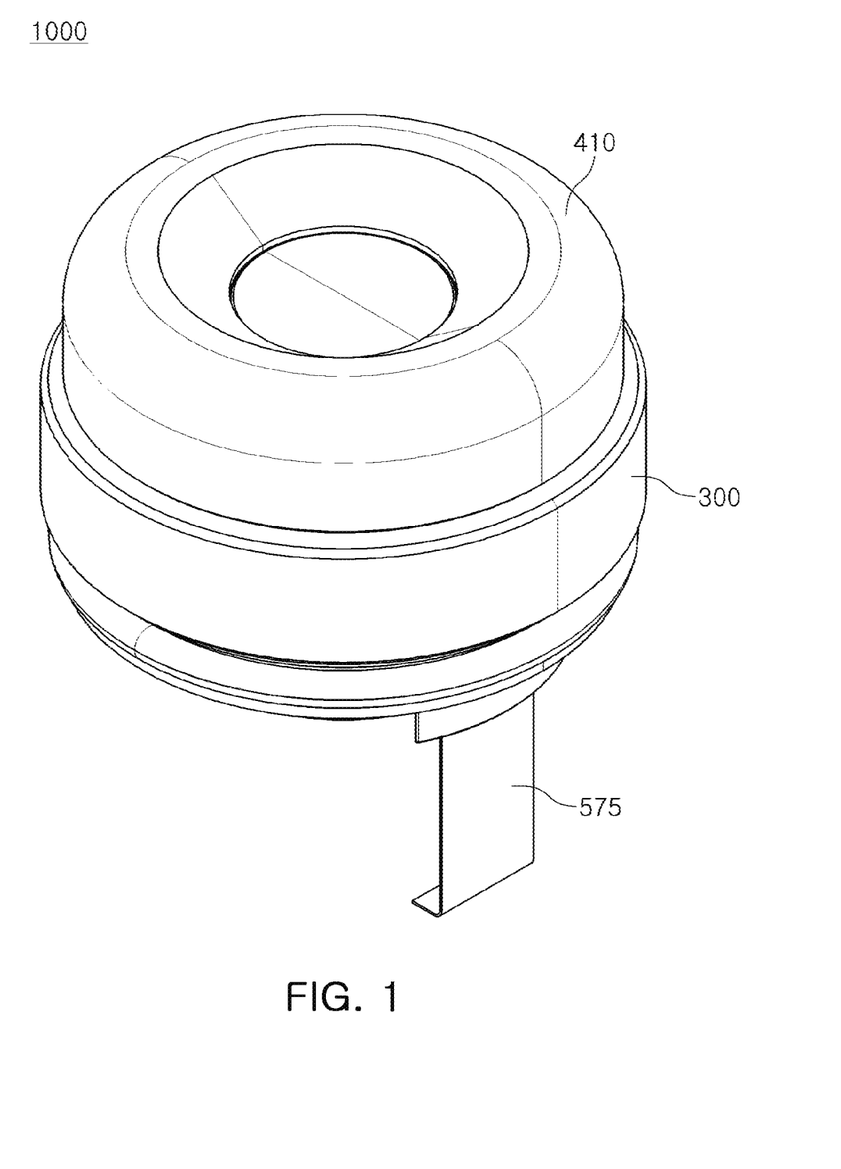
FIG. 1 is a perspective view of a camera module according to an example.
Figure 2:
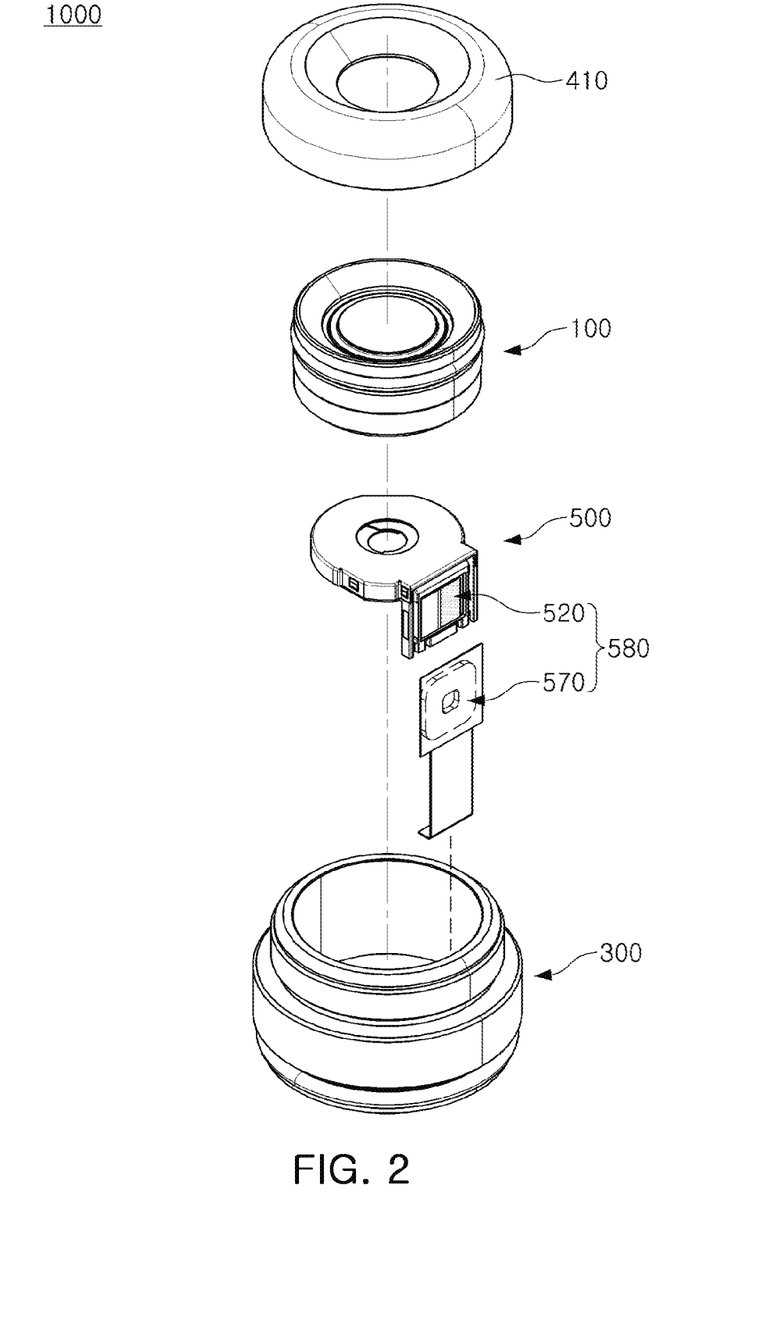
FIG. 2 is an exploded perspective view of a camera module according to an example.
Figure 3:
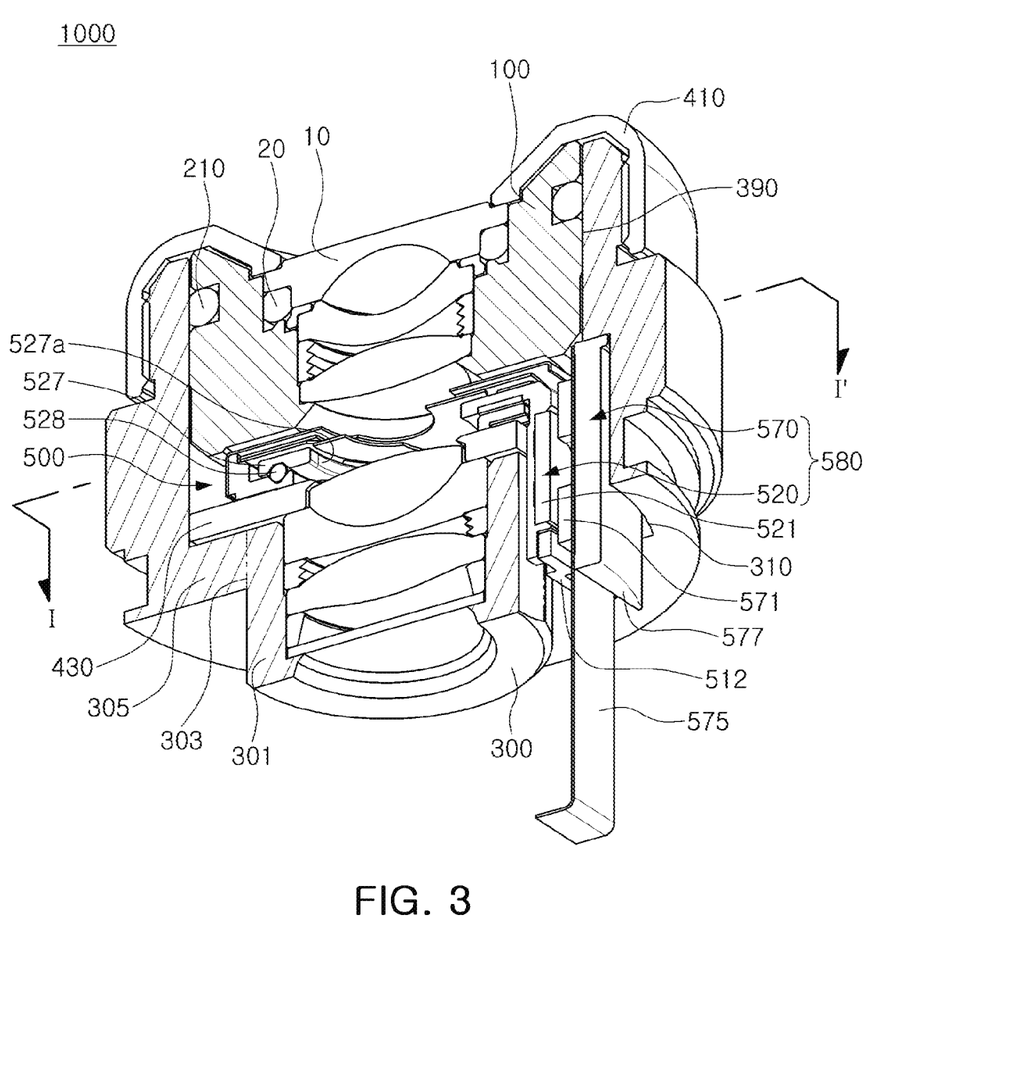
FIG. 3 is a combined cross-sectional view of a camera module according to an example.

FIG. 1 is a perspective view of a camera module according to an example. FIG. 2 is an exploded perspective view of a camera module according to an example. FIG. 3 is a combined cross-sectional view of a camera module according to an example.

Referring to FIGS. 1 to 3, a camera module 1000 may include a first lens barrel 100, a second lens barrel 300, and a stop module 500.

The first lens barrel 100 may include at least one lens aligned in an optical axis direction. The lenses provided in the first lens barrel 100 may be combined such that the second lens barrel 300 and internal lenses are aligned in an optical axis direction. The diagrams illustrate a structure in which at least one lens is provided in the first lens barrel 100, and the first lens barrel 100 is directly coupled to an interpolated portion 390 in the second lens barrel 300.

However, the first lens barrel 100 may further include a holder (not illustrated) enveloping outwardly of the first lens barrel 100, and the holder may be inserted into and coupled to the interpolated portion 390 in the second lens barrel 300. The first lens barrel 100 may have a cylindrical shape to be easily coupled, and the interpolated portion 390 may also have a cylindrical shape to correspond to the shape of the first lens barrel 100.

In an outermost object side in the first lens barrel 100, a cover glass 10 may be provided to protect internal lenses, and a sealing member 20 may be inserted between the first lens barrel 100 and the cover glass 10 for waterproofing, and the like.

The second lens barrel 300 may include at least one lens aligned in an optical axis direction. The lenses provided in the second lens barrel 300 may be aligned in an optical axis direction along with the lenses provided in the first lens barrel 100. The first lens barrel 100 may be coupled to the interpolated portion 390 in the second lens barrel 300. The first lens barrel 100 may be disposed on the object side of the camera module 1000, and the second lens barrel 300 may be disposed on an image side of the camera module. A sealing member 210 may be inserted between the first lens barrel 100 and the second lens barrel 300 for waterproofing, and the like.

The second lens barrel 300 may have a cylindrical shape. As the second lens barrel 300 substantially forms an exterior of the camera module 1000, the second lens barrel 300 may be easily coupled to another device, and the like.

A cover member 410 covering upper portions of the first lens barrel 100 and the second lens barrel 300 may be provided while the first lens barrel 100 is inserted into the second lens barrel 300.

In the diagrams, the second lens barrel 300 has a form in which a portion of the second lens barrel in which a lens is interposed is integrated with an external portion to which a driving coil 571 is coupled. However, the second lens barrel 300 may be divided into a barrel 301 in which a lens is inserted (an inner region prescribed by an imaginary cutting line 303 in FIG. 3) and a housing 305 coupled to an outer region and forming an exterior of the camera module 1000 (an outer region prescribed by the imaginary line 303 in FIG. 3), and the barrel 301 and the housing 305 may be separate components. The barrel 301 and the housing 305 may be manufactured separately and coupled to each other.

The second lens barrel 300 may include the barrel 301, in which at least one lens is provided, and the housing 305, which is exposed outwardly and to which the driving coil 571 is connected, may be provided in an outer region of the barrel 301.

The second lens barrel 300 may include the interpolated portion 390 in which a stop module 500 and the first lens barrel 300 are coupled in an upper portion of the barrel 301.

The stop module 500 may be inserted between the barrel 301 and the first lens barrel 100 to adjust the amount of incident light, depending on a diameter of a stop.

A seating portion 310 extended along an exterior of the barrel 301 may be provided in the housing 305 of the second lens barrel 300. A stop driving portion 580 including a magnet portion 520 and a coil portion 570 of the stop module 500 may be provided in the seating portion 310.

The driving coil 571 may be fixed in and coupled to an inner region of the housing 305 forming the seating portion 310. The driving coil 571, which is joined to a substrate 575, may be coupled to the inner region of the housing 305, and the driving coil 571 may be disposed to oppose a magnet 521 of the magnet portion 520.

A coil mounting member 577, which is provided in accordance with a shape of an inner wall and a space of the seating portion 310, to allow the driving coil 517 to be readily coupled to the seating portion 310 may be coupled to the driving coil 571, and more specifically to the substrate 575, and the coil mounting member 577 may be coupled to the seating portion 310.

The stop module 500 may be provided between the first lens barrel 100 and the second lens barrel 300 in an optical axis direction. The stop module 500 may be configured to selectively change the amount of light incident to the camera module 1000. For example, in the stop module 500, a plurality of incidence holes having different sizes may be provided. Depending on a surrounding environment, light may be incident through one of the plurality of incidence holes.

In a high illumination environment, a relatively low amount of light may be allowed to be incident to the camera module 1000, and in a low illumination environment, a relatively large amount of light may be allowed to be incident to the camera module 1000. Thus, image quality may be maintained constantly in various illumination conditions.

Figure 4A:
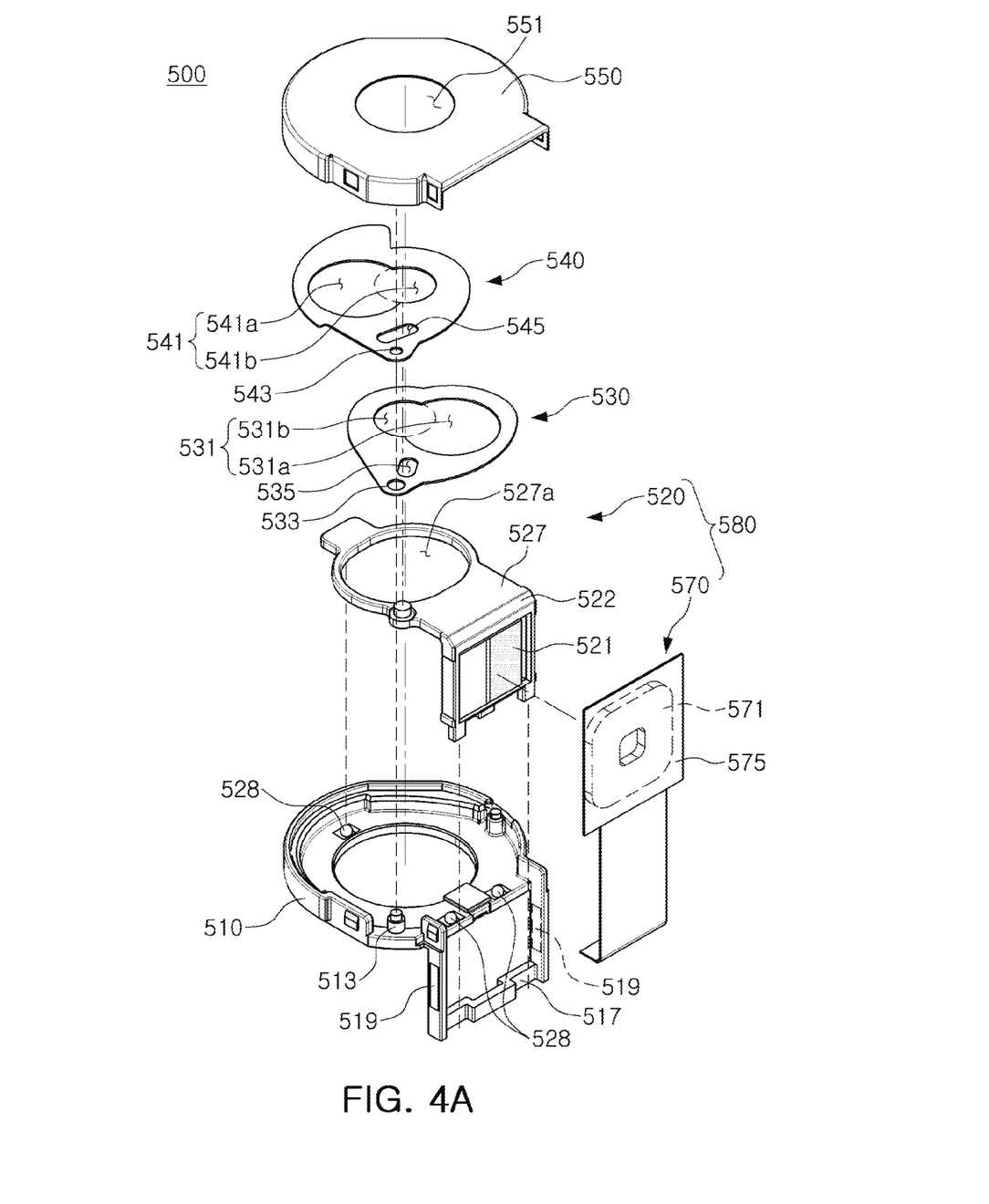
FIG. 4A is an exploded perspective view of a stop module according to an example.

Referring to FIG. 4A, a stop module 500 may include a base 510, a first blade 530, a second blade 540, and a stop driving portion 580 including a magnet portion 520 and a coil portion 570. The stop module 500 may further include a cover 550 covering the base 510, the first blade 530, and the second blade 540 and including a through-hole 551 through which light is incident. The stop module 500 may include the stop driving portion 580, but the disclosure is not limited to such a configuration. The stop module 500 may only include components other than the stop driving portion 580.

The base 510, disposed in a lower portion along an optical axis direction, may oppose the second lens barrel 300, and the cover 550, disposed in an upper portion along an optical axis direction, may oppose the first lens barrel 100. Between the base 510 and the second lens barrel 300, a coupling bracket 430 may be provided for the base 510 and the second lens barrel 300 to be easily coupled.

The stop driving portion 580 may include a magnet 521 provided in the magnet portion 520 and a driving coil 571 fixed in and coupled to the second lens barrel 300 to oppose the magnet portion 520. The magnet portion 520 may be disposed in the base 510, and may be disposed in a driving guide portion 512 to move along one axis. The driving coil 571 may be fixed in and coupled to the housing 305 in the second lens barrel 300. The driving coil 571 may be provided in the second lens barrel 300, while being coupled to the substrate 575, and the substrate 575 may be fixed in and coupled to the housing 305 to be positioned in a seating portion 310 of the second lens barrel 300. The substrate 575 may be withdrawn outwardly of the camera module 1000 and electrically and controllably connected to a driving device, a control device, and the like.

The magnet portion 520 may move rectilinearly in a direction perpendicular to an optical axis direction while being mounted on the base 510, and the driving coil 571 may be a member fixed in the housing 305 of the second lens barrel 300.

The base 510 may include the driving guide portion 512, in which the magnet portion 520 is disposed. The driving guide portion 512 may be configured to be extended in an optical axis direction from the base 510, and the driving guide portion 512 may be extended to the seating portion 310 to face the driving coil 571. The driving guide portion 512 may be configured to have a square frame shape to allow the magnet portion 520 to be easily seated. A holding yoke 519 may be provided on both ends of the driving guide portion 512 in a direction perpendicular to an optical axis direction. In the case in which the magnet portion 520 moves in both directions and is fixed on both ends, a size and a shape of an incidence hole may be accurately implemented by a combination of blades.

The magnet portion 520 may include the magnet 521 facing the driving coil 571 and a magnet holder 522 to which the magnet 521 is attached. The magnet 521 may be configured to oppose the driving coil 571 in a direction perpendicular to an optical axis direction.

The magnet portion 520 may be coupled to the driving guide portion 512 of the base 510, and may include a support portion 527 extended to an upper surface of the base 510 between the first blade 530 and the second blade 540. The support portion 527 may include a through-hole 527a, through which light penetrating through the first blade 530 and the second blade 540 penetrates. The support portion 527 may move along the magnet portion 520 when the magnet portion 520 moves in a direction perpendicular to an optical axis direction, and to readily move, a bearing, more specifically, a ball bearing 528 may be provided between an upper portion of the base 510 and the support portion 527. The support portion 527 is provided so that the magnet portion 520 may move rectilinearly while being mounted on the base 510.

In the case in which the magnet portion 520 is mounted on the driving guide portion 512, a tilting (inclination) may occur if the magnet portion 520 is not firmly fixed. Thus, a guide blade 517 may be provided in a lower portion of the driving guide portion 512 to support the magnet portion 520 and to guide the movement of the magnet portion 520.

Figure 4B:
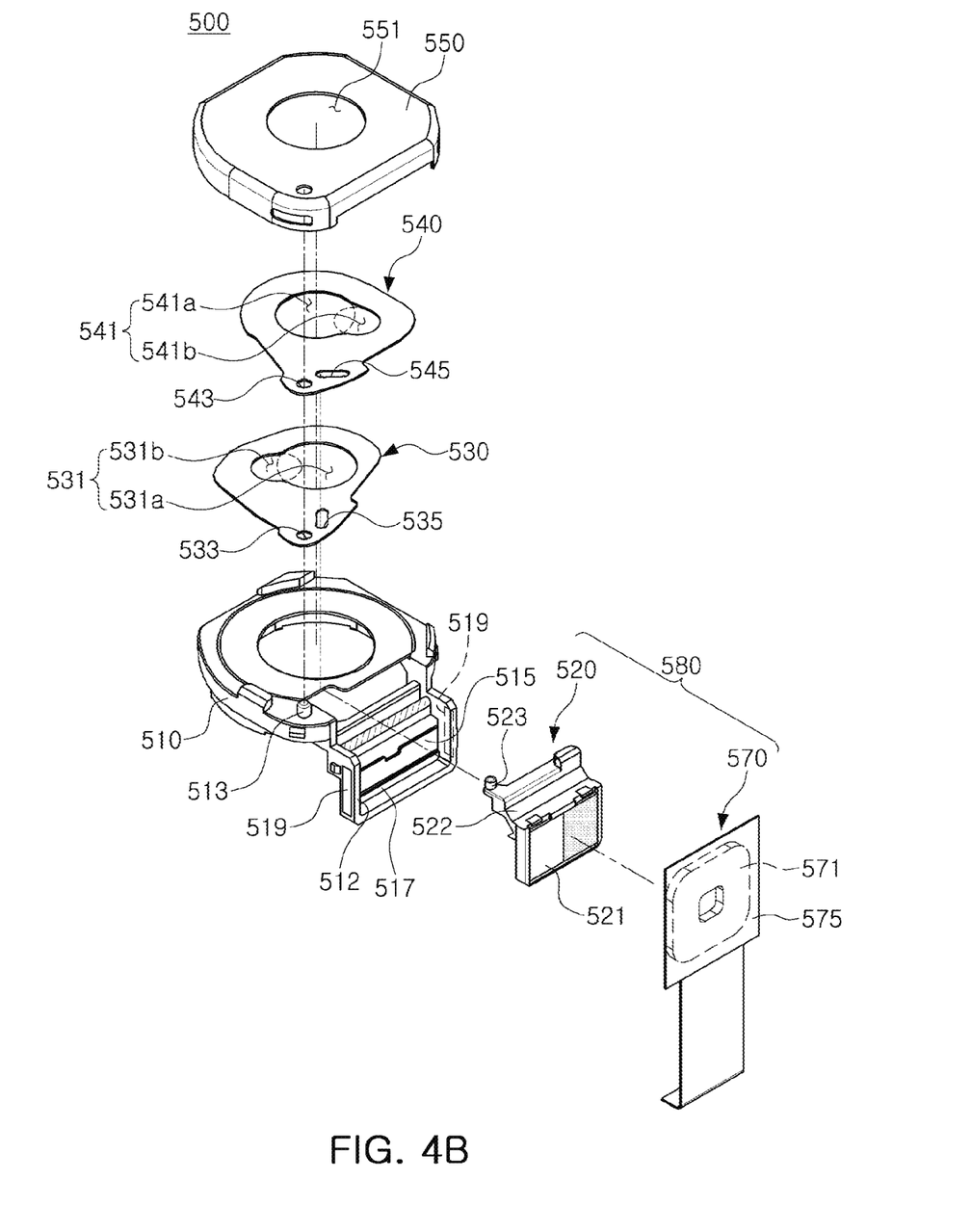
FIG. 4B is an exploded perspective view of a stop module according to an example.

Referring to FIG. 4B, a magnet portion 520 that does not include a support portion is illustrated. In this example, a different measure may be necessary for the magnet portion 520 to be supported by a base 510. A yoke 515 may be provided in a position opposing the magnet 521 in the base 510, and more specifically, in a driving guide portion 512. By an attraction force between the yoke 515 and the magnet 521, the magnet portion 520 may slide while maintaining a state in which the magnet portion 520 adheres to the driving guide portion 512.

A first protrusion 513 simultaneously penetrating through a first guide hole 533 of a first blade 530 and a second guide hole 543 of a second blade 540 may be provided in the base 510. The first blade 530 and the second blade 540 may rotate around the first protrusion 513.

A second protrusion 523 penetrating through the first blade 530 and the second blade 540 may be provided in a magnet holder 522.

The second protrusion 523 may be configured to penetrate through a third guide hole 535 of the first blade 530 and a fourth guide hole 545 of the second blade 540.

The third guide hole 535 and the fourth guide hole 545 may long and inclined towards a movement direction of the magnet 520, and the inclined directions of the third guide hole 535 and the fourth guide hole 545 may be opposite to each other.

When the magnet portion 520 moves along one axis, the second protrusion 523 may move within the third guide hole 535 and the fourth guide hole 545, and the first plate 530 and the second plate 540 may move towards the magnet portion 520 along the movement of the second protrusion 523, or may move away from the magnet portion 520 (see FIGS. 7A and 7B).

Various sizes of incidence holes may be implemented in the stop module 500. For ease of description, an example in which two incidence holes using two blades are implemented will be described, but the number of the blades may be two or more, and the number of the implemented incidence holes may be two or more. The implementable incidence holes may be formed by a continuous method in which sizes of the incidence holes change consecutively.

A stop driving portion 580 may use a closed loop method that senses a position of the magnet portion 520 and reflects the sensed position in the driving of the stop driving portion 580, as a control method. A position sensor (a hole sensor) may be provided in the stop driving portion 580. Although not illustrated, the position sensor may be disposed at the center of or beside a driving coil 571 to oppose the magnet 521.

A first through-hole 531 may be provided in a first blade 530, and a second through-hole 541 may be provided in a second blade 540. The first blade 530 and the second blade 540 may slide while being in contact with each other, and thus, the first blade 530 and the second blade 540 may be configured to be anti-static to prevent frictional electricity.

The first guide hole 533 and the third guide hole 535 may be provided in the first blade 530, and the second guide hole 543 and the fourth guide hole 545 may be provided in the second blade 540.

The first guide hole 533 and the second guide hole 543 may have circular shapes, and the third guide hole 535 and the fourth guide hole 545 may each have a circular shape lengthened in one direction and inclined in one direction. The inclined directions of the third guide hole 535 and the fourth guide hole 545 may be opposite to each other. The first guide hole 533, the second guide hole 543, the third guide hole 535, and the fourth guide hole 545 may each be referred to as a "hole," but the terms do not limit the configuration of each to a hole, but may indicate a hole shape or a groove shape.

The first through-hole 531 and the second through-hole 541 may have shapes in which a plurality of through-holes 531a and 531b, and 541a and 541b are connected to each other. The first through-hole 531 and the second through-hole 541 may have shapes in which the through-holes 531a and 541a having relatively large diameters are respectively connected to the through-holes 531b and 541b having relatively small diameters. For example, the first through-hole 531 and the second through-hole 541 may each have a gourd shape, and the through-holes 531a, 531b, 541a, and 541b may have a circular shape or a polygonal shape.

The shapes of the first through-hole 531 and the second through-hole 541 may be reverse to each other. In other words, the first blade 530 and the second blade 540 may rotate around the first protrusion 513 while both the first guide hole 533 and the second guide hole 543 are inserted into the first protrusion 513. The first through-hole 531 and the second through-hole 541 may have shapes approximately symmetrical to each other in a circumference direction.

The first blade 530 and the second blade 540 may be coupled to the base 510 such that portions of the first blade 530 and the second blade 540 overlap each other in an optical axis direction, and such that the first blade 530 and the second blade 540 may move by the stop driving portion 580. For example, the first blade 530 and the second blade 540 may be configured to rotate and move in opposite directions.

Portions of the first through-hole 531 and the second through-hole 541 may be configured to overlap each other in an optical axis direction. Portions of the first through-hole 531 and the second through-hole 541 may overlap each other in an optical axis direction to form incidence holes through which light penetrates.

Portions of the first through-hole 531 and the second through-hole 541 may overlap each other to form a plurality of incidence holes having different diameters. For example, portions of the first through-hole 531 and the second through-hole 541 may overlap each other and form an incidence hole having a relatively large diameter, and may also form an incidence hole having a relatively small diameter. The incidence holes may have a circular shape of a polygonal shape depending on shapes of the first through-hole 531 and the second through-hole 541.

Light may be allowed to penetrate through one of the plurality of incidence holes depending on surrounding environment.

Figure 5A:
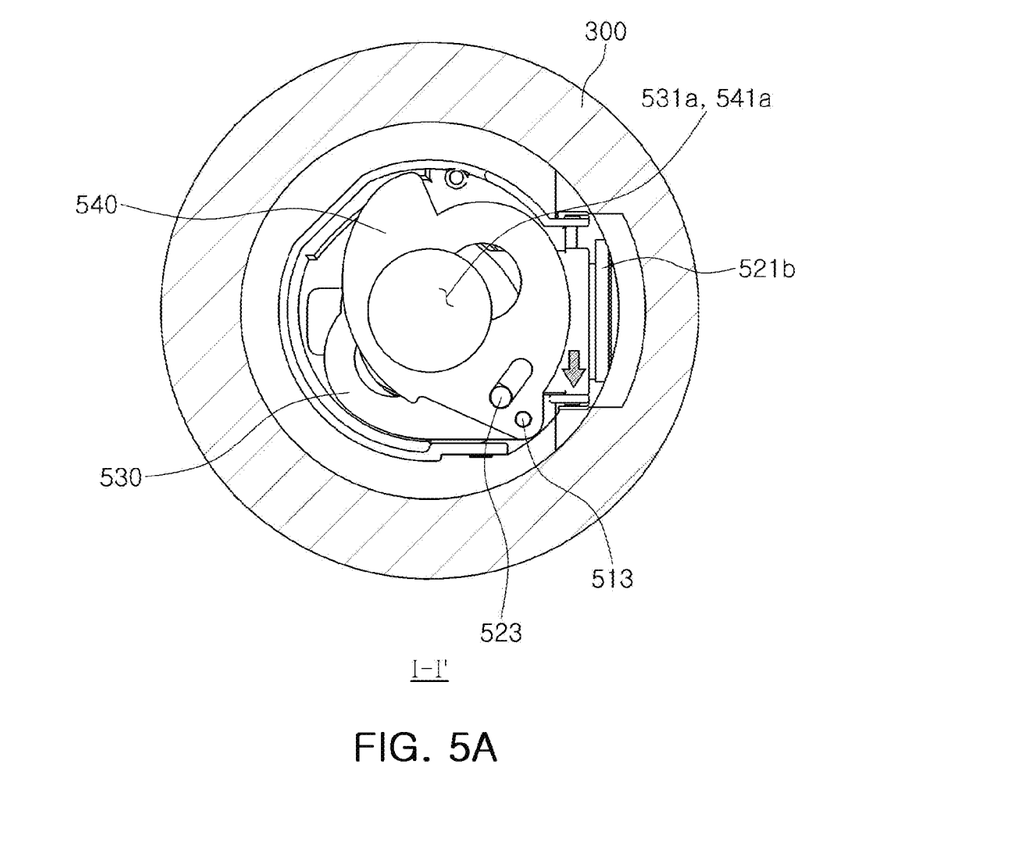
FIGS. 5A and 5B are top views of states in which a stop module is driven to change a diameter of an incidence hole.

Referring to FIG. 5A, a first blade 530 and a second blade 540 may rotate and move about a first protrusion 513 by a stop driving portion 580, and portions of a first through-hole 531 and a second through-hole 541 may overlap each other to form an incidence hole having a relatively large diameter.

Figure 5B:
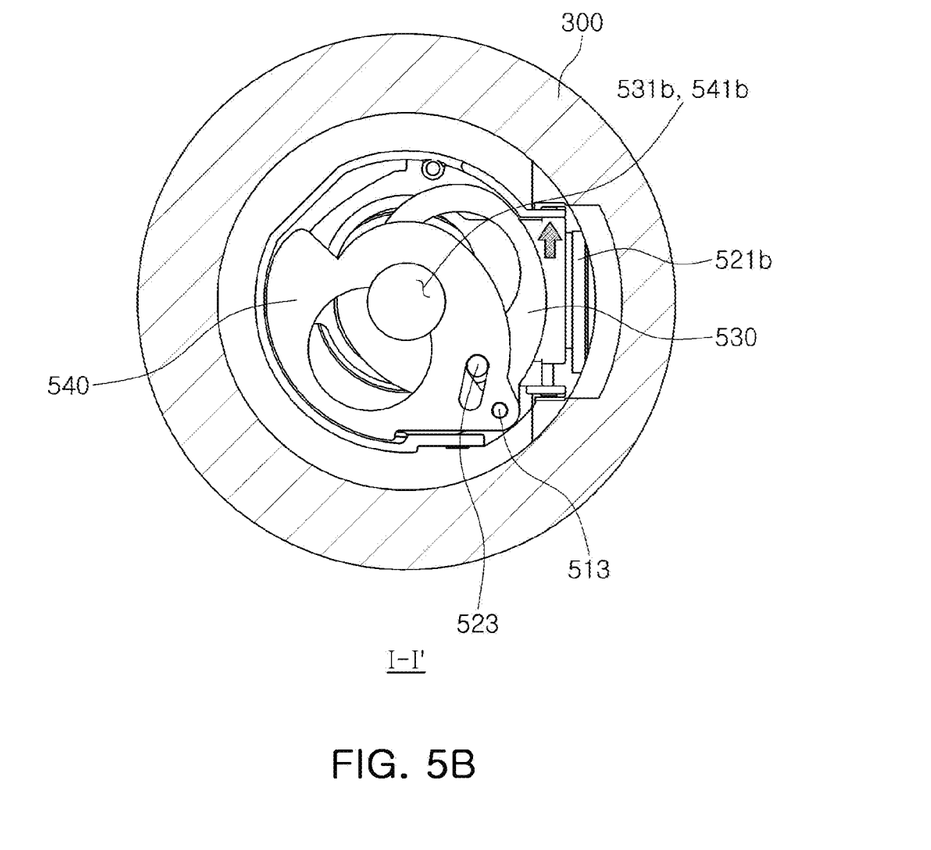

Referring to FIG. 5B, a first blade 530 and a second blade 540 may rotate and move about a first protrusion 513 by a stop driving portion 580, and portions of a first through-hole 531 and a second through-hole 541 may overlap each other and form an incidence hole having a relatively small diameter.

Figure 6:
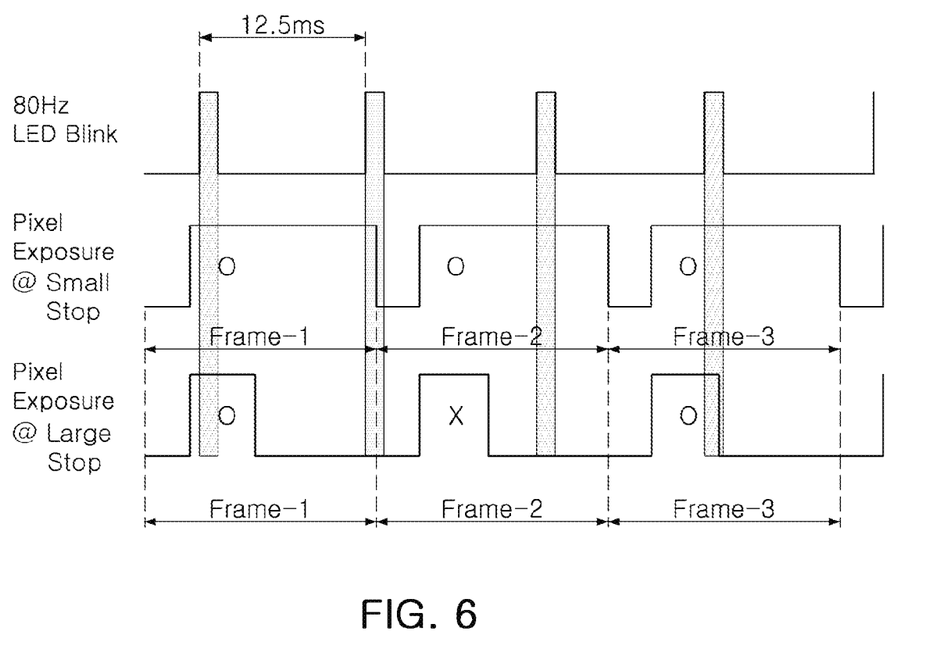
FIG. 6 is a reference diagram illustrating a camera module according to an example in relation to a degradation phenomenon in a camera according to an example.

FIG. 6 is a reference diagram illustrating a camera module according to an example in relation to a degradation phenomenon in a camera.

As illustrated in FIG. 6, in the case in which an exposure time is reduced to prevent saturation of an image in order to compensate for a dynamic range by using a large diameter stop (a large stop), it may be difficult to implement an LED flicker mitigation (LFM).

As illustrated in FIG. 6, by using a variable iris in a camera module in an environment in which the amount of light is high, the amount of incident light may be reduced by applying a small diameter stop (a small stop) to set an exposure time to be longer than an LED blinking period, thereby securing an LFM performance, and even when a certain level of exposure time is secured, images may not be saturated. In a low illumination environment, by using a large diameter stop (a large stop) to increase the amount of light, an LFM and a wide dynamic range (WDR) may be implemented regardless of a surrounding environment, and a certain level of illumination may be secured even in a low illumination environment.

According to the examples, a camera module for preventing degradation of images in a camera by adjusting an exposure time of a camera may be provided, thereby reducing image degradation in a vehicle camera.

A camera module according to any of the examples may be provided in a place or a device affected by external illumination environment, such as a vehicle, a CCTV camera, a security camera, and the like.

While the exemplary embodiments have been shown and described above, it will be apparent to those skilled in the art that modifications and variations could be made without departing from the scope of the present invention as defined by the appended claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a first lens barrel comprising a first lens;
a second lens barrel comprising a second lens that is aligned with the first lens in an optical axis direction; and
a stop module disposed between the first lens barrel and the second lens barrel and comprising
blades configured to form one or more incidence holes having various sizes,
a magnet portion coupled to the blades and comprising a driving magnet opposing a driving coil, and configured to move back and forth rectilinearly in a direction perpendicular to the optical axis direction to rotate the blades to form the one or more incidence holes, and
a substrate on which the driving coil is mounted, the substrate extending externally of the second lens barrel.

2. The camera module of claim 1, wherein the first lens barrel is disposed on an object side of the stop module, and the second lens barrel is disposed on an image side of the stop module.

3. The camera module of claim 1, wherein the driving coil is fixed in the second lens barrel.

4. The camera module of claim 1, wherein the blades are disposed in an object side portion of the stop module, and the stop module comprises a base including a driving guide portion extended in the optical axis direction.

5. The camera module of claim 4, wherein the magnet portion is mounted on the driving guide portion.

6. The camera module of claim 5, wherein the magnet portion comprises a support portion extended to an object side portion of the base, and the support portion comprises a through-hole configured to pass light.

7. The camera module of claim 6, wherein the base comprises a bearing configured to facilitate a movement of the support portion.

8. The camera module of claim 4, wherein the base comprises a yoke opposing the driving magnet.

9. The camera module of claim 4, wherein the second lens barrel comprises a seating portion and the driving coil is fixed in the seating portion.

10. The camera module of claim 9, wherein the driving guide portion extends internally of the seating portion.

11. The camera module of claim 9, further comprising:
a coil mounting member coupled to the seating portion in a state in which the driving coil is coupled to the coil mounting member.

12. The camera module of claim 4, wherein the driving guide portion comprises a yoke opposing the driving magnet.

13. The camera module of claim 1, wherein the second lens barrel comprises an interpolated portion configured to accommodate the first lens barrel.

14. The camera module of claim 13, further comprising:
a cover member configured to cover upper portions of the first lens barrel and the second lens barrel in a state in which the first lens barrel is inserted into the cover member.

15. The camera module of claim 1, wherein as the magnet portion moves rectilinearly in a first direction perpendicular to the optical axis direction, at least one of the incident holes decreases in size, and
as the magnet portion moves rectilinearly in a second direction opposite to the first direction and perpendicular to the optical axis direction, the at least one of the incident holes increases in size.

16. A camera module, comprising:
a first lens barrel comprising a first lens;
a second lens barrel coupled to a driving coil, and comprising a second lens that is aligned with the first lens in an optical axis direction;
blades disposed between the first lens barrel and the second lens barrel and configured to adjust a size of one or more incidence holes formed by through-holes in the blades,
a magnet portion comprising a driving magnet that opposes the driving coil, and configured to move back and forth rectilinearly in a direction perpendicular to the optical axis direction; and
a substrate on which the driving coil is mounted, the substrate extending externally of the second lens barrel.

17. The camera module of claim 16, wherein at least two of the blades overlap each other in the optical axis direction.

18. The camera module of claim 16, wherein the blades are configured to rotate in order to adjust the size of the one or more incidence holes.

19. The camera module of claim 18, wherein the blades include a first blade configured to rotate in a first direction and a second blade configured to rotate in a second direction that is opposite to the first direction.

* * * * *